United States Patent [19]

Pilarski

[11] Patent Number: 4,549,769
[45] Date of Patent: Oct. 29, 1985

[54] BELT CLAMPING GUIDE LOOP
[75] Inventor: Regis V. Pilarski, Utica, Mich.
[73] Assignee: General Motors Corporation, Detroit, Mich.
[21] Appl. No.: 632,958
[22] Filed: Jul. 20, 1984
[51] Int. Cl.⁴ .............................................. B60R 21/10
[52] U.S. Cl. ..................................... 297/483; 280/808; 297/474
[58] Field of Search ................ 280/801, 808; 297/474, 297/478, 480, 483

[56] References Cited
U.S. PATENT DOCUMENTS 4,306,735 12/1981 Pfeiffer et al. ...................... 280/808
4,491,343 1/1985 Fohl ..................................... 297/483

FOREIGN PATENT DOCUMENTS 0013221 2/1977 Japan ................... 280/808

Primary Examiner—James T. McCall
Attorney, Agent, or Firm—Charles E. Leahy

[57] ABSTRACT

A guide loop assembly for deflecting a restraint belt from a retractor to a diagonal position across the occupant torso includes a guide loop frame having a slot defined by an anvil surface over which the belt slides during winding and unwinding of belt from the retractor. The guide loop frame also has an elongated aperture which receives an anchor bolt to mount the guide loop frame on the pillar for pivotal movement and as well as limited vertical movement. A support frame is pivotally mounted by the anchor bolt and has a clamping bar pivotally mounted thereon for movement between a normal position spaced away from the anvil surface of the guide loop frame and a clamping position clamping the belt against the anvil surface. A spring biases the clamping bar to the normal position spaced away from the anvil surface and also urges the clamping bar against the guide loop frame to position the guide loop frame at the upward limit of its vertical movement. The imposition of an occupant restraint load on the belt moves the guide loop frame vertically downward and pivots the clamping bar downwardly to clamp the belt against the anvil surface of the guide loop frame with a clamping force increasing as a function of the increasing load on the belt.

2 Claims, 4 Drawing Figures

BELT CLAMPING GUIDE LOOP

The invention relates to a guide loop assembly for a motor vehicle occupant restraint system and more particularly provides a clamping mechanism which clamps the belt against sliding movement through the loop assembly in response to imposition of an occupant restraint load on the belt.

BACKGROUND OF THE INVENTION

It is well known in motor vehicle seat belt systems to pivotally mount a guide loop on the pillar to deflect the belt from a seat belt retractor mounted on the floor to a diagonal position across the occupant upper torso. These seat belt retractors typically include a locking mechanism which locks the belt against unwinding from the retractor in response to the onset of a sensed vehicle deceleration condition.

It is also known in prior art to provide a clamping mechanism which is associated with the guide loop assembly and functions to clamp the belt against sliding movement through the guide loop in consequence of imposition of an occupant restraint load on the belt. Examples of such belt clamping guide loops include Weman U.S. Pat. Nos. 3,847,434 issued Nov. 12, 1974; Balder 3,898,715 issued Aug. 12, 1975; Lindblad 4,009,510 issued Mar. 1, 1977; Jahn 4,341,359 issued July 27, 1982; Lefeuvre 3,886,374 issued May 27, 1975; Lefeuvre 3,924,875 issued Dec. 9, 1975; Takada 4,208,770 issued June 24, 1980; Mauron 3,911,535 issued Oct. 14, 1975; Pickett 4,310,175 issued Jan. 12, 1982; Shimogawa et al 4,371,127 issued Feb. 1, 1983 and Furusawa et al 4,310,176 issued Jan. 12, 1982.

The present invention provides a new and improved clamping guide loop assembly.

SUMMARY OF THE INVENTION

According to the invention the guide loop frame has a slot defined by an anvil surface over which the belt slides during winding and unwinding of belt from the retractor. The guide loop frame also has an elongated aperture which receives an anchor bolt so that the guide loop frame is mounted on the pillar for pivotal movement and as well as limited vertical movement. A support frame is pivotally mounted by the anchor bolt and has a clamping bar pivotally mounted thereon for movement between a normal position spaced away from the anvil surface of the guide loop frame and a clamping position clamping the belt against the anvil surface. A spring biases the clamping bar to the normal position spaced away from the anvil surface and also urges the clamping bar against the guide loop frame to position the guide loop frame at the limit of vertical movement furthest away from the retractor. When the retractor is locked by a sensed vehicle deceleration condition and the occupant restraint load is imposed on the belt, the guide loop frame moves vertically downward and in so doing pivots the clamping bar downwardly to clamp the belt against the anvil surface of the guide loop frame with a clamping force increasing as a function of the increasing load on the belt. When the occupant restraint load is removed from the belt, the spring returns the clamping bar to the normal position spaced away from the anvil surface and returns the guide loop frame vertically to its normal position.

Accordingly the object, feature and advantage of the invention resides in the provision of a guide loop frame mounted for yieldable vertical movement in response to the imposition of the occupant restraint load on the belt and wherein such vertical movement of the guide frame induces pivotal movement of a clamping bar to clamp the belt against the anvil surface of the guide loop frame.

A further object, feature and advantage of the invention resides in the provision of a clamping bar pivotally mounted on the pillar of a vehicle body and engaged by a guide loop yieldably mounted for vertical downward movement by the imposition of an occupant restraint load so that the clamping bar is forcibly pivoted to clamp the belt against the anvil surface.

DESCRIPTION OF THE DRAWINGS

These and other features, objects and advantages of the invention will become apparent upon consideration of the specification and appended drawings in which.

DESCRIPTION OF THE PREFERRED EMBODIMENT

Figure 1:
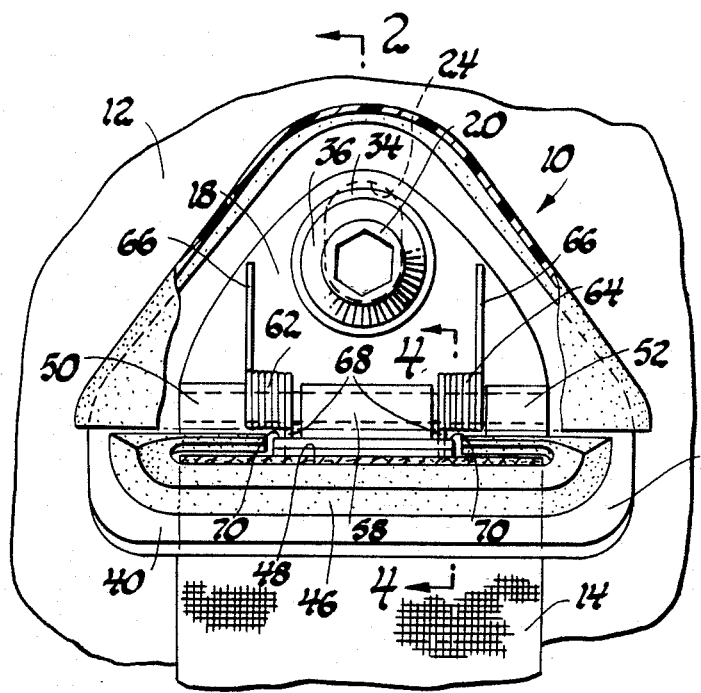
FIG. 1 is a frontal elevation view of the belt clamping guide loop assembly of this invention.
Figure 2:
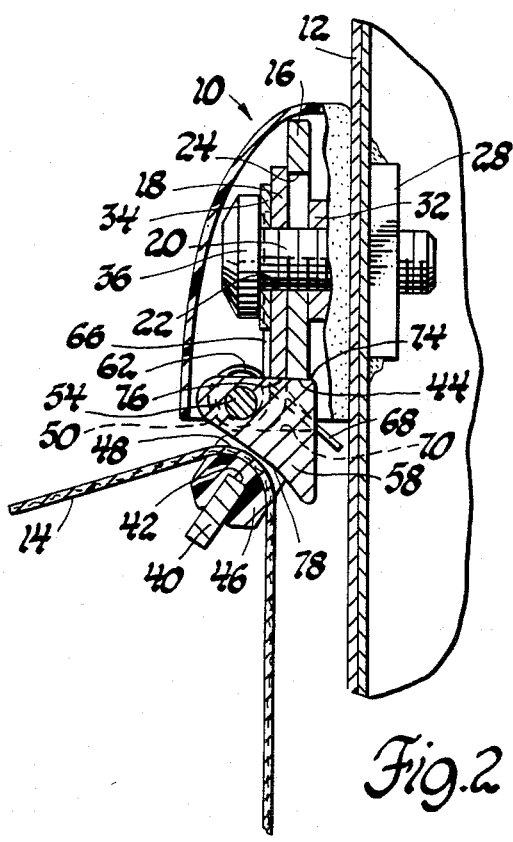
FIG. 2 is a sectional view taken in the direction of arrows 2—2 of FIG. 1 and showing the belt normally unclamped for free sliding movement through the guide loop.

Referring to FIGS. 1 and 2 there is shown a belt clamping guide loop assembly generally indicated at 10 which is mounted on a vehicle body pillar 12 and slidably receives a restraint belt 14.

The guide loop assembly 10 includes a guide loop frame 16 and a support frame 18 which are mounted on the pillar 12 by an anchor bolt 20. The anchor bolt 20 extends through a circular aperture 22 in the support frame 18 and through a vertically elongated slot 24 in the guide loop frame 16. Bolt 20 extends through a hole in the pillar 12 and is threadedly engaged in a weld nut 28. A spacer 32 is provided between the guide loop frame 16 and the pillar 12. A washer 34 is provided between the head 36 of the anchor bolt 20 and the support frame 18.

The lower portion 40 of the guide loop frame 16 is bent outwardly from the pillar 12 at an angle of approximately 30 degrees. A cutout is provided in the lower portion 40 to receive the belt 14. The cutout is defined by a lower wall 42 and an upper wall 44. The lower wall 42 is preferably covered by a plastic insert 46 which provides an anvil surface 48 over which the belt 14 slides during its winding and unwinding from the retractor. Reference may be had to U.S. Pat. No. 3,959,855, Robert C. Fisher, issued June 1, 1976, for a description of such a plastic insert 46.

Figure 4:
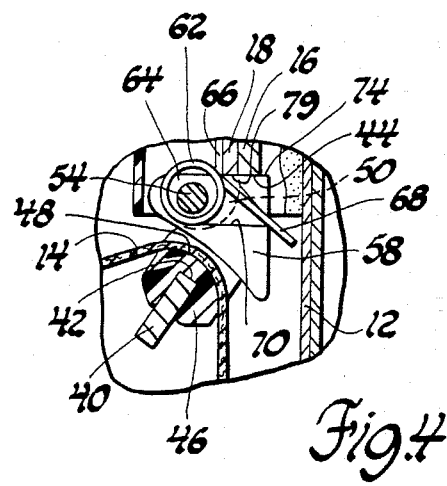
FIG. 4 is a partial fragmentary section taken in the direction of arrows 4—4 of FIG. 1.

The lower edge of the support frame 18 is curled upwardly to provide a pair of laterally spaced apart trunions 50 and 52 which mount a pivot shaft 54. The pivot shaft 54 mounts a clamping bar 58 between the trunions 50 and 52. As best seen in FIGS. 1 and 4 a pair of coil springs 62 and 64 encircle the shaft 54 and each spring has a leg 66 which bears on the support frame 18 and a leg 68 which extends through an opening 70 in the clamping bar 58. The coil springs 62 and 64 function to bias the clamping bar 58 to the normal position shown in FIGS. 2 and 4 in which the top face 74 of the clamping bar 58 bears against the bottom edge 76 of the support frame 18. Simultaneously the top face 74 of the clamping bar 58 urges the guide loop frame 16 to its normal vertically raised position of FIG. 2.

Thus, with the clamping bar 58 and the guide loop frame 16 established at their normal positions of FIG. 2, the dimension of the effective belt slot between the plastic insert 46 and a lower clamping surface 78 of the clamping bar 58 slightly exceeds the thickness of the belt 14 so that the belt 14 can freely slide through the guide loop assembly.

Figure 3:
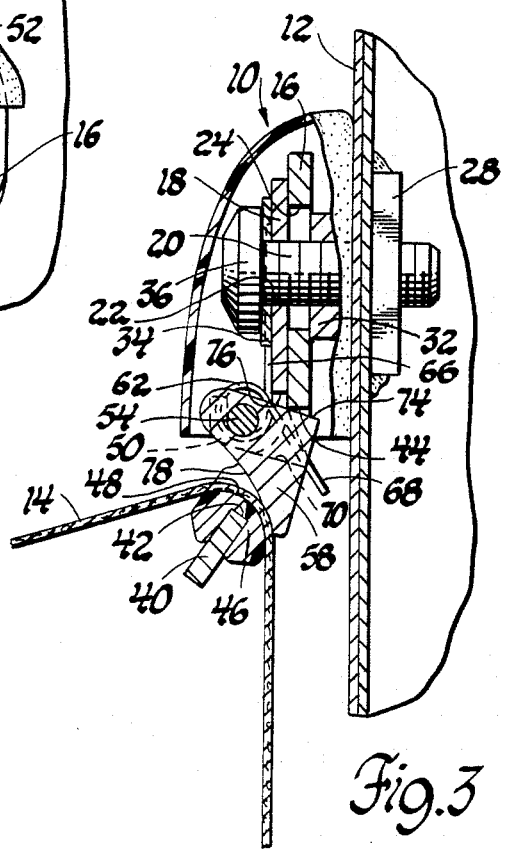
FIG. 3 is a view similar to FIG. 2 but showing the belt clamped against sliding movement through the belt clamping guide loop assembly.

When the motor vehicle experiences a rapid deceleration the seat belt retractor is locked against belt unwinding rotation. The forward movement of the occupant relative the seat imposes an occupant restraint load on the belt 14. This occupant restraint load on the belt 14 forcibly displaces the guide loop frame 16 vertically downwardly as permitted by the elongated slot 24 as best shown in FIG. 3. The downward movement of the guide loop frame 16 causes its upper wall 44 to force pivotal movement of the clamping bar 58 about the pivot shaft 54 so that the downward pivoting movement of the clamping bar 58 and its clamping surface 78 overtakes the downward movement of the plastic insert 46 with the guide loop frame 16 and the belt 14 is clamped upon anvil surface 48 of the plastic insert 46. Accordingly, the greater the occupant load imposed on the belt 14, the greater will be the downward force on the guide loop frame 16 to force the clamping bar 58 against the belt 14.

When the occupant restraint load is removed from the belt, the coil springs 62 and 64 will pivot the clamping bar 58 counterclockwise to the normal position of FIG. 2 and in so doing will simultaneously lift the guide loop frame 16 vertically upward to its normal position of FIG. 2. Thus the belt clamping guide loop mechanism is automatically reset to enable free sliding movement of the restraint belt 14 through the guide loop assembly.

Thus it is seen that the invention provides a new, novel and useful belt clamping guide loop assembly for a motor vehicle seat belt system.

The embodiments of the invention in which an exclusive property or privilege is claimed are defined as follows:

1. A restraint belt guide loop assembly adapted to be mounted on the pillar of a vehicle body and slidably receive the belt from a locking retractor and deflect the belt diagonally across the occupant shoulder comprising:

a first frame having a slot therethrough defined by an anvil surface over which the belt slides, and a second frame;

means pivotally mounting the first and second frames on the pillar and additionally mounting the first frame for limited vertical movement relative to the second frame;

a clamping bar pivotally mounted on the second frame for pivotal movement between a normal position spaced away from the anvil surface of the first frame by a distance greater than one belt thickness and a clamping position clamping the belt against the anvil surface of the first frame;

spring means acting to establish the first frame and the clamping bar at their respective normal positions to enable free sliding movement of the belt through the first frame and being yieldable upon imposition of an occupant restraint load on the first frame by the belt whereby the first frame moves vertically relative to the second frame and thereby induces a forced pivotal movement of the clamping bar into clamping engagement with the belt whereby the clamping bar forcibly clamps the belt against the anvil surface.

2. A restraint belt guide loop assembly adapted to be mounted on the pillar of a vehicle body and slidably receive the belt from a locking retractor and deflect the belt diagonally across the occupant shoulder comprising:

a frame having a slot therethrough and an anvil surface over which the belt slides;

means mounting the frame on the pillar for limited downward movement relative to the pillar by an occupant restraint load;

a clamping bar;

means pivotally mounting the clamping bar in the path of downward movement of the frame and adjacent to the anvil surface of the frame;

spring means acting to establish the frame and the clamping bar at their respective normal positions in which the clamping bar is spaced away from the anvil surface of the frame by a distance greater than one belt thickness to enable free sliding movement of the belt through the frame, said spring being yieldable upon imposition of an occupant restraint load on the frame by the belt whereby the frame moves downwardly relative to the second frame and thereby forces a pivotal movement of the clamping bar into clamping engagement with the belt to forcibly clamp the belt against the anvil surface and against sliding movement through the frame.

* * * * *